Nov. 21, 1939.         H. B. LEE                 2,181,059
                        VALVE
                  Filed May 17, 1937        2 Sheets-Sheet 1
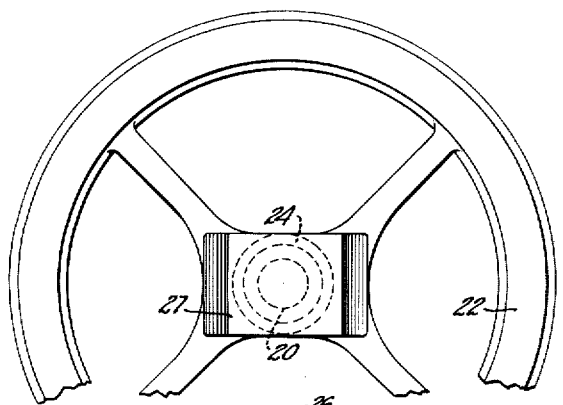
Fig. 2
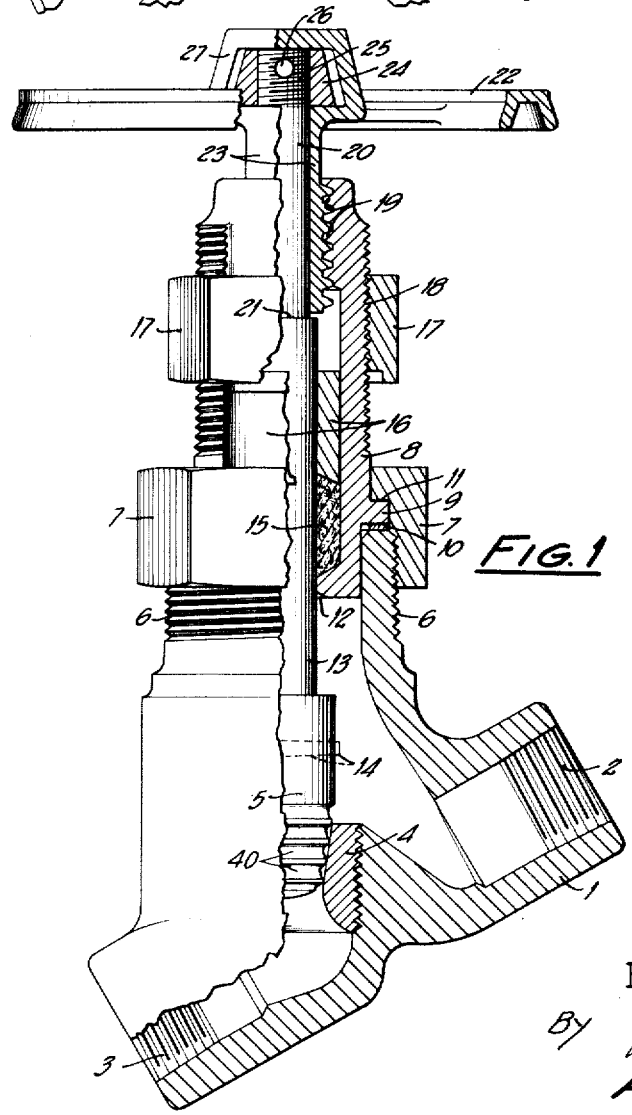
Fig. 1
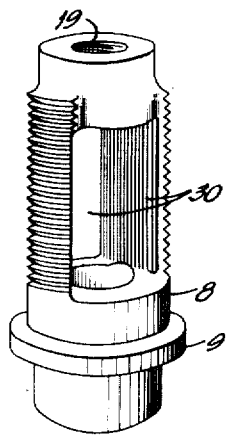
Fig. 3
INVENTOR
HENRY B. LEE
ATTORNEY INVENTOR
HENRY B. LEE
By
ATTORNEY Patented Nov. 21, 1939

2,181,059

UNITED STATES PATENT OFFICE 2,181,059

VALVE

Henry B. Lee, Troy, N. Y., assignor to The Ludlow Valve Manufacturing Co. Inc., Troy, N. Y., a corporation of New York Application May 17, 1937, Serial No. 142,977

7 Claims. (Cl. 251—49)

My invention relates to plug valves and particularly to small size valves of this general type and to valves, such as those disclosed in my United States Letters Patent Reissue No. 17,824, wherein the flow passage between the plug and its seat includes a plurality of expansion receiving chambers.

Considerable difficulty has heretofore been encountered in designing stems for small size valves which are sufficiently strong to withstand, without fracture, the twisting stress some times applied thereto in closing the valve. It frequently happens that where the stem cannot be made larger in diameter than say ¼" and the effective cross section is further reduced by threads, slots, annular cuts, pin holes, or the like which are formed therein in order to secure the plug thereto, that a strong man, in turning the hand wheel to close the valve tightly, will twist the stem off in some such zone of reduced section.

Furthermore, where a valve is operating at high temperature, as example, on a high pressure steam line, it is a well recognized fact that when the hot valve is tightly closed, the expansion of the parts on cooling will withdraw the plug slightly from the seat and cause leakage. In such cases it is necessary, after the valve has cooled, to tighten it again in order to force the plug firmly into the seat.

Again, in the so-called multi-stage, valves of the type disclosed in my Letters Patent aforesaid, and in which the plug rotates as it is forced into its seat, there is some tendency to gall or score either the seat or the plug. This may be overcome to a considerable degree by providing a swivel connection between the valve stem and the plug, but since the connection is inside the valve and is therefore exposed to the fluid passing therethrough, corrosion or scale formation frequently prevents the proper functioning of the swivel so that the plug and stem turn together and galling results. Moreover, in the smaller valves, the swivel connection necessarily reduces substantially the cross-section of the stem and it is not unusual for the stem to shear off in the plug.

One of the objects of my invention is to provide a valve of such design that the stem is not subjected to twisting stresses in opening and closing the valve but in which the stresses developed are purely tension and compression. Another object is to provide what may be termed a "full-floating" valve stem or, in other words, a stem which is freely rotatable with respect to the hand wheel or other element used to open and close the valve but which cooperates therewith to move the plug relative to its seat. Another object is to provide a valve having a swivel connection between the plug and hand wheel which is positioned exterior of the valve whereby it is not subjected to the corrosive influence of fluids passing through the valve. A further object is to provide a plug valve which, when once closed at high temperature, will remain closed or, in other words, a valve in which the parts thereof will be so arranged that the plug, if there is any tendency whatever for it to move as the valve cools, will be forced firmly into its seat rather than be withdrawn therefrom.

With these objects in view, my invention includes the novel elements and the combinations and arrangements thereof described below and illustrated in the accompanying drawings in which—

Fig. 1 is a vertical elevation of the valve, partially in section;

Fig. 2 is a top plan view;

Fig. 3 is a perspective view of a detail;

Figure 5:
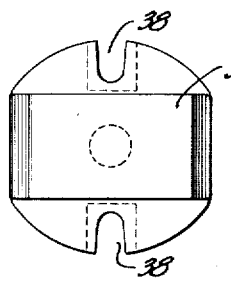
Fig. 5 is a plan view of a modified type of collar.
Figure 4:
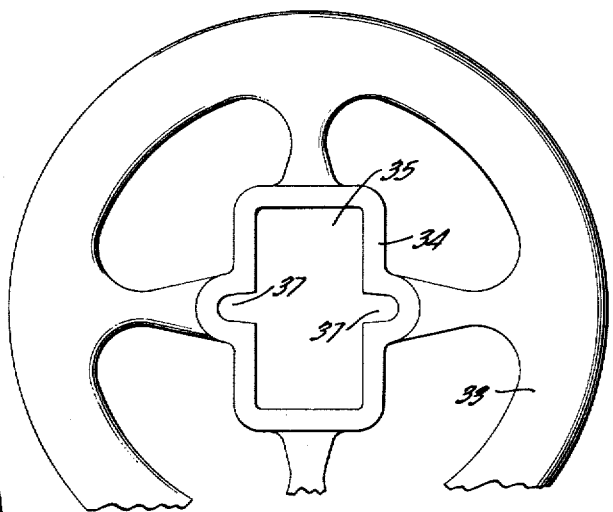
Fig. 4 is a fragmentary plan view of a modified type of hand wheel.
Figure 6:
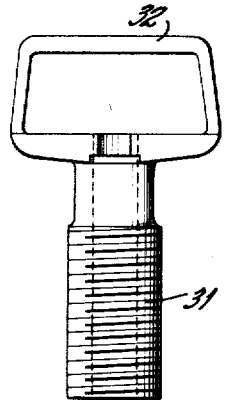
Fig. 6 is an elevation view of the modified collar.

Referring to the drawings, 1 is the body of the valve which is provided with the usual, internally threaded openings 2 and 3 for the reception of pipes. A seat 4 is threaded into the body, and a plug 5 cooperates with the seat 4 to open and close the valve. The upper portion of the body 1 is externally threaded as shown at 6 to receive the nut 7 which secures the bonnet 8 thereto. The bonnet is provided with an annular flange 9 which seats upon the upper end of the body and, if desired, a washer or gasket 10 may be interposed between the collar 9 and the body 1. The top of the nut 7 engages the collar 9, as shown at 11, and holds it securely to the body of the valve. The bottom of the bonnet is provided with an axial opening 12 adapted to permit the passage of the stem 13 which is secured to the plug 5 preferably by a threaded connection and a pin 14. Above its bottom, the bore of the bonnet is enlarged to receive packing material 15 which is compressed about stem 13 by means of the gland 16 and which, in turn, is compressed by means of the packing nut 17 threaded on the outside of the bonnet as shown at 18. In order that the gland 16 may be inserted in the bonnet the sides of the bonnet are cut away as shown at 30. At the extreme upper end, the bonnet is internally threaded, preferably with a comparatively coarse, square thread 19. The upper portion of the stem is reduced in diameter, as shown at 20, to provide a bearing for hand wheel 22 which is rotatably mounted thereon.

The hand wheel 22 is provided with an externally threaded stem or collar 23 which cooperates with the square threads 19 on the interior of the bonnet, the lower end of said collar being disposed in slightly spaced relation from the shoulder 21 of stem 13. Wheel 22 is secured against axial movement relative to the stem 13 by means of a nut 24 which is threaded on the upper end of the stem, as shown at 25, and secured by means of a pin 26, preferably positioned near the extreme end of the nut to avoid weakening the stem when it is subjected to stress. The hand wheel 22 is also provided at the top with a strap-like portion 27 which overlies and abuts the upper end of the stem 13.

From the foregoing it will be apparent that except when the plug is in firm frictional engagement with the valve seat, the stem 13 with the plug 5 thereon may turn freely relative to all of the other portions of the valve assembly. When the hand wheel 22 is turned in one direction, the cooperation of the threaded collar 23 with the threaded interior of the bonnet will raise the stem and thus withdraw the plug from the seat, and when turned in the opposite direction, the stem will be lowered and the plug forced into its seat.

The collar 23 must be connected to the hand wheel in order to turn therewith and hence, as a matter of practice, these parts are preferably made integral. By forming the stem of steel, and the collar and wheel of bronze which has a coefficient of thermal expansion and contraction about one and one-half times as great as steel, I find that when the valve is shut with the parts thereof at high temperature it will not leak upon cooling. Although the contraction of the stem on cooling may tend to withdraw the plug from its seat, the greater contraction of the material in that portion of the collar 23 between the outer end of the stem and the zone of threaded connection between the collar and bonnet urges the outer end of the stem towards the valve seat and thus forces the plug more firmly into its seat. Furthermore, since the aforesaid portion of the collar 23 is entirely outside the valve and thus exposed to the ambient air it cools more rapidly than would be the case if it were within the valve body.

While I prefer to make the wheel and collar integral, it is clear that the material of which the wheel itself is made is of no particular moment because it is the greater contraction of the collar relative to the stem which maintains the plug in close contact with the seat on cooling. Hence, it is of importance only that the material of the collar have a substantially greater coefficient of thermal contraction than the material of the stem in order to attain the advantages of this phase of the invention.

In Figs. 4, 5, 6 and 7, I have shown details and an assembly in which the collar and wheel are not integral. Here, the bronze collar 31 is provided at the top with a strap-like element 32 adapted to overlie and abut the top of the stem 13 and function in the same manner as strap 27 shown in Figs. 1 and 2.

Figure 7:
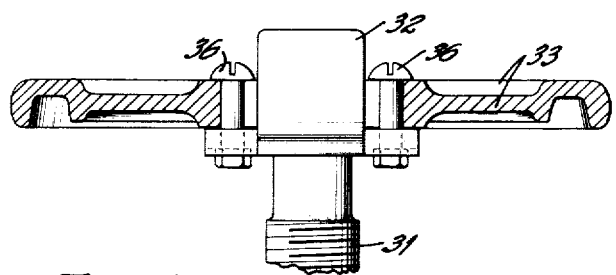
Fig. 7 is a fragmentary elevation view, partially in section, of the wheel and collar assembly.

The hand wheel 33, which may be of steel or iron, is provided with a central hub portion 34 having a rectangular opening 35 therein adapted to fit about the strap 32, as shown in Fig. 7, and to be secured to the collar 31 by means of bolts 36 which pass through the notches 37 in the hub and the notches 38 in the top of the stem.

Obviously, the advantages which flow purely from the mechanical design and arrangement of the various parts may be attained by making the hand wheel and collar of any suitable materials irrespective of their coefficients of expansion.

The advantages of a "full floating" stem and plug assembly are particularly apparent in valves of the type shown in Fig. 1 when the plug (or the seat) is provided with a plurality of circumferential grooves 40 adapted to effect a multistage reduction in the pressure of the fluid passing through the valve. Since the movement of the plug in the opening and closing of the valve is a straight line motion without rotation relative to the seat, there is no tendency whatsoever to gall or score the seat, and these advantages, like those attendant upon the differential in thermal contraction of the collar and stem, may be attained in valves of all sizes.

While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. In a valve of the character described, the combination with a body, of a stem, and means cooperating with said body and stem and rotatable with respect to both for moving said stem relative to said body both to open and close the valve; said means being formed of a material having a substantially higher coefficient of thermal expansion and contraction than the material of the stem; whereby upon the cooling and contraction of said means it will urge said stem in a valve-closing direction.

2. In a valve comprising a body, a seat in said body, and a plug adapted to cooperate with said seat for closing the valve, the combination with a stem connected to said plug for raising and lowering the same relative to said seat, of manually operable means formed of a material having a substantially higher coefficient of thermal expansion and contraction than the material of said stem and cooperating with said body and stem for both opening and closing said valve; whereby said means, upon a contraction thereof due to a reduction in its temperature, will cooperate wtih said stem in valve-closed position to maintain said plug in fluid-tight engagement with said seat.

3. In a valve comprising a body, a seat in said body, and a plug adapted to cooperate with said seat for closing the valve, the combination with a stem connected to said plug for raising and lowering the same relative to said seat, of means formed of a material having a substantially higher coefficient of thermal expansion and contraction than the material of said stem and cooperating with said stem and body to effect a relative movement thereof for both opening and closing said valve; one zone of said means being in substantially fixed relation to said body when the valve is closed but having a portion extending substantially beyond said zone and cooperating with the end of said stem to urge the same toward said seat upon a thermal contraction of said means.

4. A valve comprising a body, a seat therein, a plug adapted to cooperate with said seat, a stem secured to said plug, an internally threaded bonnet secured to said body, a hand wheel rotatably secured to said stem and provided with a threaded collar cooperating with said internally threaded bonnet, and means for preventing relative axial movement of said stem and wheel; said collar being formed of a material having a substantially higher coefficient of thermal expansion and contraction than the material of said stem, whereby, upon a thermal contraction of said collar, it will urge said stem and plug toward said seat.

5. In a valve comprising a body having a seat therein, the combination with a plug adapted to cooperate with said seat, of a stem secured to said plug and rotatable therewith, rotatable means cooperating with said body and stem for opening and closing said valve, and means exterior of said body forming a swivel connection between said rotatable means and said stem; whereby the opening and closing of said valve is effected without rotation of said stem and plug; and said rotatable means being formed of a material having a substantially greater coefficient of thermal expansion and contraction than the material of said stem whereby, upon a thermal contraction thereof, it will urge said stem and plug towards said seat.

6. A valve comprising a body, a plug and seat therein forming between them a flow passage provided with a plurality of expansion receiving chambers, a stem secured to said plug and rotatable therewith, and rotatable means cooperating wtih said body and with said stem by means of a swivel connection exterior of said body for moving said plug relative to said seat; said swivel connection functioning to prevent rotation of said stem and plug relative to said seat when said rotatable means is actuated to open or close the valve; and said rotatable means being formed of a material having a substantially greater coefficient of thermal expansion and contraction than the material of said stem whereby, upon a thermal contraction thereof, it will urge said stem and plug towards said seat.

7. In a valve of the character described, the combination with a body, provided wtih a valve stem extending exteriorly thereof, of means rotatable with respect to both said body and stem for effecting a movement of said stem relative to said body both to open and close the valve, and means connected between said first mentioned means and said body comprising a material having a substantially higher coefficient of thermal expansion and contraction than the material of said stem whereby, upon a thermal contraction of said last mentioned means, it will urge said stem in a valve-closing direction.

HENRY B. LEE.